(12) United States Patent
Jingu et al.

(10) Patent No.: US 8,720,621 B2
(45) Date of Patent: May 13, 2014

(54) ELECTRICALLY DRIVEN VEHICLE

(75) Inventors: Nobuhisa Jingu, Izunokuni (JP); Shintaro Utsumi, Susono (JP); Satoko Tofukuji, Susono (JP); Kazuhito Sakai, Makinohara (JP); Hirotsugu Ojima, Susono (JP); Atsunori Kumagai, Sunto-gun (JP); Hiroki Murata, Gotenba (JP); Takanobu Arai, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 6 days.

(21) Appl. No.: 13/509,520

(22) PCT Filed: Nov. 12, 2009

(86) PCT No.: PCT/JP2009/069263
§ 371 (c)(1),
(2), (4) Date: May 11, 2012

(87) PCT Pub. No.: WO2011/058631
PCT Pub. Date: May 19, 2011

(65) Prior Publication Data
US 2012/0228874 A1    Sep. 13, 2012

(51) Int. Cl.
*B60K 5/10*    (2006.01)
(52) U.S. Cl.
USPC ........ 180/65.31; 180/291; 180/298; 180/69.6
(58) Field of Classification Search
USPC ............ 180/65.1, 291, 298, 65.31, 68.5, 69.6
See application file for complete search history.

(56) References Cited

U.S. PATENT DOCUMENTS

| | | | |
|---|---|---|---|
| 5,137,108 A | 8/1992 | Knowlton et al. | |
| 7,224,132 B2 * | 5/2007 | Cho et al. | 318/139 |
| 7,582,978 B2 * | 9/2009 | Flanigan et al. | 290/1 A |

(Continued)

FOREIGN PATENT DOCUMENTS

| | | |
|---|---|---|
| DE | 102007004171 | 7/2008 |
| JP | 3 204341 | 9/1991 |

(Continued)

OTHER PUBLICATIONS

International Search Report Issued on Feb. 16, 2010 in PCT/JP09/069263 Filed Nov. 12, 2009.

(Continued)

*Primary Examiner* — Katy M Ebner
(74) *Attorney, Agent, or Firm* — Oblon, Spivak, McClelland, Maier & Neustadt, L.L.P.

(57) ABSTRACT

An electrically driven vehicle equipped with a battery usable for running in which a power generation unit of engine driven type that charges the battery is detachably mounted on a vehicle body, includes including a first connection part that brings a high-voltage system in which the battery and the power generation unit are electrically connected together into a connected state in a state in which the power generation unit is mounted in a mounting position and brings the high-voltage system into a disconnected state in a state in which the power generation unit is dismounted from the mounting position, whereby the first connection part switches a connection state of the high-voltage system in accordance with installation or removal of the power generation unit. The first connection part includes a connector on the vehicle side and a connector on the power generation unit side.

1 Claim, 6 Drawing Sheets

(56) References Cited

U.S. PATENT DOCUMENTS

| | | | |
|---|---|---|---|
| 8,376,071 B2 * | 2/2013 | Lind | 180/65.31 |
| 2004/0104578 A1 | 6/2004 | Wurtele | |
| 2004/0225435 A1 | 11/2004 | Ogawa et al. | |
| 2007/0185637 A1 | 8/2007 | Ogawa et al. | |
| 2008/0136257 A1 | 6/2008 | Flanigan et al. | |
| 2009/0101422 A1 * | 4/2009 | Subramanian | 180/65.31 |
| 2010/0147606 A1 * | 6/2010 | Kalenborn et al. | 180/65.21 |

FOREIGN PATENT DOCUMENTS

| | | |
|---|---|---|
| JP | 8 1167 | 7/1996 |
| JP | 10 80006 | 3/1998 |
| JP | 2001 197604 | 7/2001 |
| JP | 2003 286000 | 10/2003 |
| JP | 2004 289884 | 10/2004 |
| JP | 2004 355929 | 12/2004 |
| JP | 2007 238013 | 9/2007 |
| WO | WO 00/74964 | 12/2000 |

OTHER PUBLICATIONS

Extended European Search Report in App. No. 09851263.5-1752/2500204 PCT/JP2009069263, dated Nov. 5, 2013.

* cited by examiner

ELECTRICALLY DRIVEN VEHICLE

TECHNICAL FIELD

The present invention relates to electrically driven vehicles, and more particularly, to an electrically driven vehicle equipped with a battery usable for running.

BACKGROUND ART

Conventionally, there is known an electrically driven vehicle equipped with a battery usable for running. It is known that such an electrically driven vehicle may be a golf cart, a forklift, a construction machine or the like. A high degree of freedom of movement may be secured by configuring the electric drive vehicle to use a battery to supply power to a source for running.

The use of the battery for power supply needs to charge the battery. In this regard, Patent Document 1 discloses a vehicle equipped with an engine generation type charger. This vehicle is configured to always charge the battery by the engine generation type charger when the vehicle is in use. Therefore, the vehicle is capable of preventing the depth of discharge of the battery from becoming large. As arts that may be relative to the present invention, Patent Document 2 discloses an art of making it possible to easily remove an engine from a vehicle for maintenance and inspection, and an art of stopping an engine and then removing the engine in removal of the engine from the vehicle.

PRIOR ART DOCUMENTS

Patent Documents

Japanese Patent Application Publication No. 2001-197604
Japanese Patent Application Publication No. 03-204341

SUMMARY OF THE INVENTION

Problem to be Solved by the Invention

The vehicle disclosed in Patent Document 1 always charges the battery when the vehicle is in use. Therefore, the vehicle is always equipped with the engine generation type charger. Thus, the vehicle has an increased weight equal to the weight of the engine generation type charger, and the energy efficiency deteriorates accordingly.

In this regard, it is conceivable to detachably mount a power generation unit (for example, an engine driven type of power generation unit or a fuel cell type of power generation unit) on the vehicle. In this case, the power generation unit is removed from and installed in the vehicle as necessary, so that deterioration of the energy efficiency due to an increase in weight can be suppressed.

In detachable installation of the power generation unit, the power generation unit is also required to be installed detachably in terms of electricity. In this regard, since the power generation unit is a heavy object, its handling such as positioning in installation is not always easy. Thus, in order to install the power generation unit detachably in terms of electricity, it may be rational to use wires such as a cable that may be easily handled in making a connection between the power generation unit and the vehicle body.

However, the presence of the wires between the power generation unit and the vehicle body may damage the coating of wires in an installation or removal work on the power generation unit, for example. Further, the presence of the wires between the power generation unit and the vehicle body needs manual handling of the wires in installation and removal of the power generation unit. Furthermore, the wires connecting the power generation unit and the vehicle body together include high-voltage-system wires for charging the battery as well as low-voltage-system wires used for control. Thus, a serious electric shock accident may happen, particularly when the high-voltage-system wires are manually handled.

In this regard, it is also conceivable to bring the wire portions between the power generation unit and the vehicle body into a non-conducting state in installation or removal of the power generation unit, for example. However, even in the case, there is a possibility that the user may touch a damaged portion of the coating when the user who notices an abnormality after the power generation unit placed in position starts to operate tries to inspect the power generation unit in operation. Also, there is a possibility that a short circuit via the damaged portion of the coating may take place after the power generation unit placed in position starts to operate.

The present invention was made taking the above problem into consideration, and aims at providing an electrically driven vehicle capable of ensuring safety of an electrical installation or removal work on a power generation unit.

Means for Solving the Problem

The present invention that solves the above problem is an electrically driven vehicle equipped with a battery usable for running, a power generation unit of engine driven type that charges the battery being detachably mounted on a vehicle body, and the electrically driven vehicle including a connection part that brings a first electric system in which the battery and the power generation unit are electrically connected together into a connected state in a state in which the power generation unit is mounted in a mounting position and brings the first electric system into a disconnected state in a state in which the power generation unit is dismounted from the mounting position, whereby the connection part switches a connection state of the first electric system in accordance with installation or removal of the power generation unit, wherein the connection part electrically connects the vehicle body and the power generation unit together in the state in which the power generation unit is mounted in the mounting position and brings a second electric system having a system voltage lower than that of the first electric system into a connected state and that brings the second electric system into a disconnected state, whereby the connection part switches a connection state of the second electric system in accordance with installation or removal of the power generation unit.

Also, the present invention is preferably configured so that the connection part is a hybrid connection part common to the first and second electric systems.

Effects of the Invention

According to the present invention, it is possible to ensure safety of an installation or removal work on the power generation unit.

BRIEF DESCRIPTION OF THE DRAWINGS

FIGS. 7(a) through 7(c) are diagrams schematically illustrating a second connection part 44, wherein FIG. 7(a) illustrates the second connection part 44 in which connectors 441 and 442 are in a disconnected state, FIG. 7(b) illustrates the second connection part 44 in which terminals T12 and 22 of a low-voltage system L out of the connectors 441 and 442 are brought into a connected state, and FIG. 7(c) illustrates the second connection part 44 in which terminals T11 and 21 of a high-voltage system out of the connectors 441 and 442 are brought into a connected state;

MODES FOR CARRYING OUT THE EMBODIMENTS

Now, embodiments for carrying out the invention are described in detail with reference to the drawings.

Figure 1:
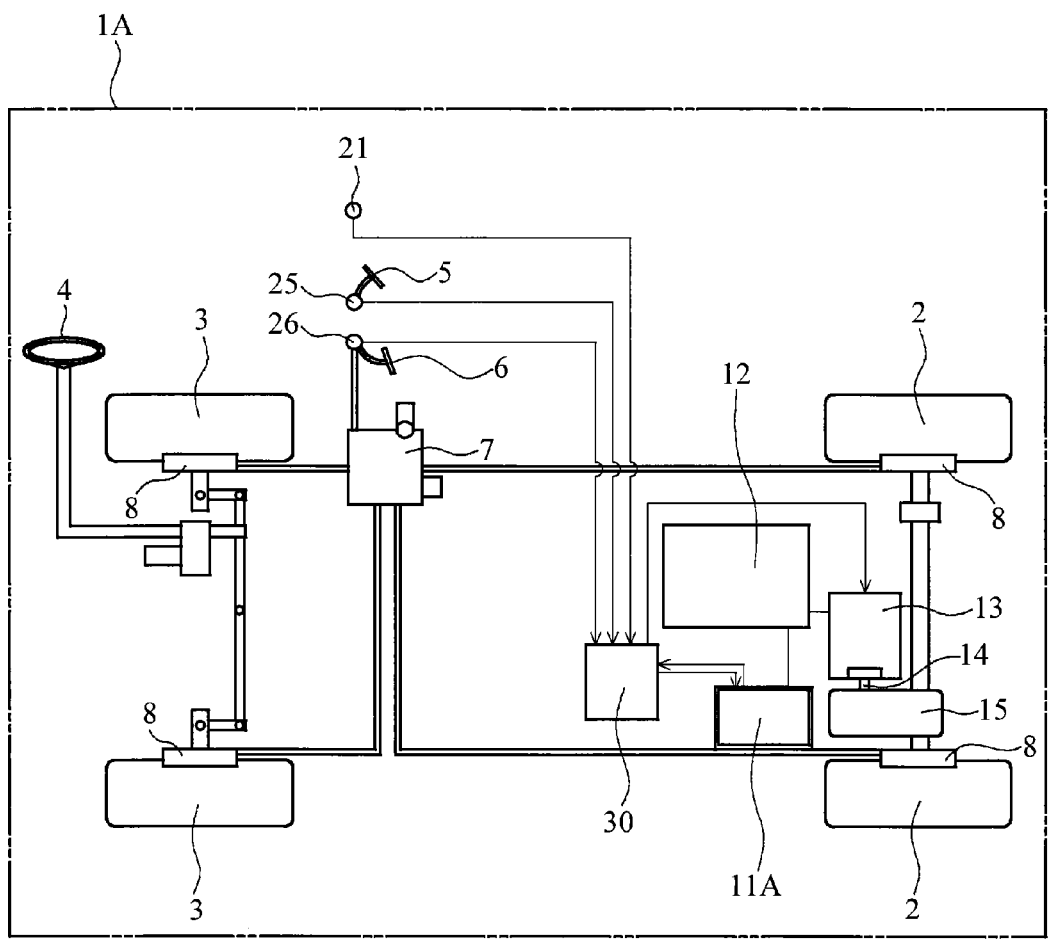
FIG. 1 is a diagram schematically illustrating an electrically driven vehicle 1A.

Referring to FIG. 1, an electrically driven vehicle 1A is equipped with a power generation unit 11A, a battery 12, and an electric motor 13. The power generation unit 11A is detachably installed in the electrically driven vehicle 1A. The electrically driven vehicle 1A with the power generation unit 11A being detachably installed can operate even in a state in which the power generation unit 11A is not installed and an electric connection with the power generation unit 11A is not made. A portion of the electrically driven vehicle 1A other than the power generation unit 11A detachably installed forms a vehicle body.

Figure 2:
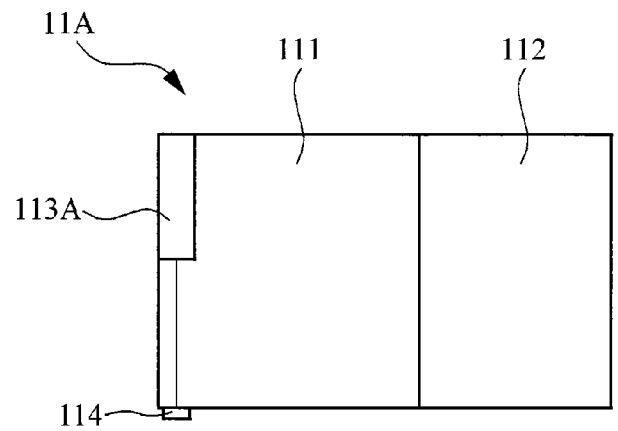
FIG. 2 is a diagram schematically illustrating a power generation unit 11A.

The power generation unit 11A is an engine driven type of power generation unit. As illustrated in FIG. 2, the power generation unit 11A is equipped with an engine 111, a generator 112, a power generation unit side ECU (Electronic Control Unit) 113A, and an operation switch 114. The engine 111 drives the generator 112, which generates alternating current. Then, the alternating current thus generated is converted to direct current by a not-illustrated rectifying circuit before being charged in the battery 12. The ECU 113A on the power generation unit side is provided for primarily controlling the engine 111. The operation switch 114 is simple drive operation means and is provided for starting and stopping the power generation unit 11A. Specifically, the operation switch 114 is a switch that makes it possible to operate and stop the power generation unit 11A independently in a state in which the power generation unit 11A is electrically disconnected from the vehicle body. The operation switch 114 is electrically connected to the ECU 113A on the power generation unit side.

The battery 12 is a DC battery and is electrically and detachably connected to the power generation unit 11A. The battery 12 may be configured to have multiple batteries having a rated DC voltage of 12 V connected in series, for example. The electric motor 13 is a source for running, and is a DC motor. The electric motor 13 is supplied with power from the battery 12, and rotates an output shaft 14. Then, the rotary output is transmitted, via a transmission 15, to a pair of right and left rear wheels 2, which are driving wheels, so that the rear wheels 2 can be driven. As described above, the electrically driven vehicle 1A is a series hybrid type of electrically driven vehicle.

The electrically driven vehicle 1A is equipped, in addition to the pair of right and left rear wheels 2 of the driving wheels, with a pair of right and left front wheels 3 that are steering wheels, a handle 4 for manually steering the front wheels 3, an acceleration pedal 5 for changing the number of revolutions of the electric motor 13, a brake pedal 6 and a brake unit 7 for braking the vehicle, and drum brakes 8 coupled with the brake pedal 6 by wires, joined to the brake unit 7 and provided to the front wheels 2 and the rear wheels 3. The acceleration pedal 5 is provided with an acceleration position sensor 25 that senses the amount of depression of the acceleration pedal 5, and the brake pedal 6 is provided with a brake switch 26 that senses whether the brake pedal 6 is depressed or not.

The electrically driven vehicle 1A is further provided with a key switch 21. The key switch 21 is a switch that enables selective switching operation between ON and OFF. The key switch 21 is vehicle drive operation means realized to make an operation request to the power generation unit 11A and the electric motor 13. Specifically, when the key switch 21 is ON, the operation request to the electric motor 13 is made. When the key switch 21 is OFF, the operation request to the electric motor 13 is not made.

The electrically driven vehicle 1A is further equipped with a vehicle side ECU 30, which is a first control unit. The ECU 30 on the vehicle side is equipped with a microcomputer composed of a CPU, a ROM, a RAM and so on, and an input/output circuit, which are not illustrated. The ECU 113A on the power generation unit side, which is a second control unit, is configured similarly. The power generation unit 11A (more specifically, the ECU 113A on the power generation unit side) is electrically and detachably connected to the ECU 30 on the vehicle side. Various objects to be controlled such as the electric motor 13 are electrically connected to the ECU 30 on the vehicle side, and further, various sensors and switches such as the key switch 21, the acceleration position sensor 25 and the brake switch 26 are electrically connected thereto.

When the key switch 21 is OFF, the ECU 30 on the vehicle side is in a standby state in which various control operations may be executed appropriately as necessary. In the standby state, the ECU 30 is capable of, for example, detecting the states of sensors and switches, controlling the various control objects other than the electric motor 13, and outputting a drive request signal. In a case where multiple batteries that form the battery 12 and have a rated voltage of, for example, 12 V are installed, the ECU 30 on the vehicle side may be supplied with power from any one of the batteries.

The ROM is configured to store a program in which various processes executed by the CPU are described and to store map data. The CPU executes the processes on the basis of the program stored in the ROM while using a temporary memory area ensured in the RAM as necessary, so that various control means, determination means, detection means and calculation means can be functionally realized in the ECU 30 on the vehicle side and the ECU 113A on the power generation unit side.

Figure 3:
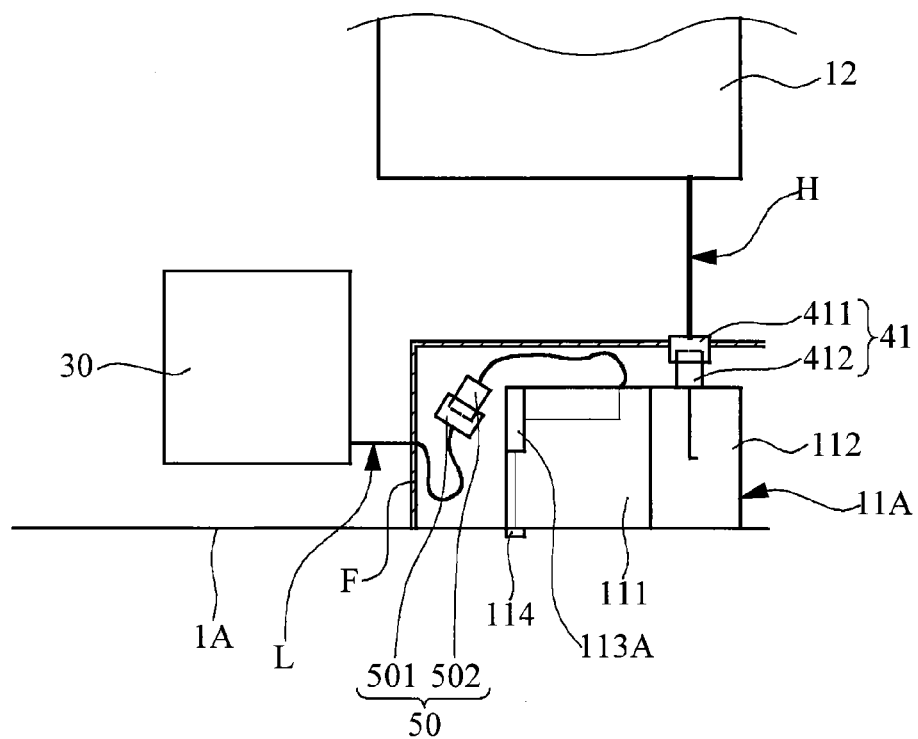
FIG. 3 is a diagram schematically illustrating a main part of the electrically driven vehicle 1A.

As illustrated in FIG. 3, the power generation unit 11A and the vehicle body are interconnected by a high-voltage system H, which is a first electric system. The high-voltage system H is a power system electric system used for charging the battery 12. Specifically, the high-voltage system H interconnects the power generator 112 and the battery 12. A first connection part 41 is provided to the high-voltage system H. The first connection part 41 includes a vehicle side connector 411, which is a first terminal component on the vehicle side, and a power generation unit side connector 412, which is a first terminal component on the power generation unit side. The connector 411 is fixed to the vehicle body (specifically, frame F), and the connector 412 is fixed to the power generation unit 11A. The connector 411 and the connector 412 are disposed so as to be interconnected in a state in which the power generation unit 11A is mounted in a mounting position.

The power generation unit 11A and the vehicle body are electrically interconnected detachably by the low-voltage system L, which is the second electric system. The low-voltage system L is an electric system of a control system used for controls, and another electric system besides the first electric system that interconnects the power generation unit 11A and the vehicle body. Specifically, the low-voltage system L interconnects the ECU 30 on the vehicle side and the ECU 113A on the power generation unit side. The low-voltage system L is provided with a wire-added connection part 50. The wire-added connection part 50 includes a connector 501 on the vehicle side, and a connector 502 on the power generation unit side. The connectors 501 and 502 are not fixed, but the connector 501 is connected to the vehicle body (specifically, the ECU 30 on the vehicle side) via wires, and the connector 502 is connected to the power generation unit 11A (specifically, the ECU 113A on the power generation unit side) via wires. The low-voltage system L handles a system voltage lower than that of the high-voltage system H.

The functions and effects of the electrically driven vehicle 1A are described. In installation of the power generation unit 11A, a connection between the connector 411 and the connector 412 is made when the power generation unit 11A is mounted in the mounting position. Thus, the first connection part 41 brings the high-voltage system H into the connected state. At the time of dismounting the power generation unit 11A, the connection between the connector 411 and the connector 412 is released when the power generation unit 11A is displaced from the mounting position. Thus, the first connection part 41 brings the high-voltage system H into the disconnected state. The first connection part 41 switches the connection state of the high-voltage system H in accordance with the installation and removal of the power generation unit 11A.

In the electrically driven vehicle 1A equipped with the first connection part 41, there are no wires between the power generation unit 11A and the vehicle body in the high-voltage system H. Thus, the electrically driven vehicle 1A has no case where the coatings of the wires of the high-voltage system are damaged in the installation or removal work on the power generation unit 11A, for example. Further, the electrically driven vehicle 1A is capable of avoiding manual handling of wires of the high-voltage system H in installation or removal of the power generation unit 11A. Thus, the electrically driven vehicle 1A is capable of preventing the occurrence of a serious electric shock accident in the manual handling of the wires of the high-voltage system H. Furthermore, the electrically driven vehicle 1A is capable of preventing the user from touching a damaged portion of the coatings of the wires of the high-voltage system H and having an electric shock in the inspection work on the power generation unit 11A in operation. It is also possible to prevent the occurrence of a short circuit via a damaged portion of the coatings of the wires of the high-voltage system H after the power generation unit 11A mounted in the mounting position starts to operate in the electrically driven vehicle 1A.

Embodiment 2

Figure 4:
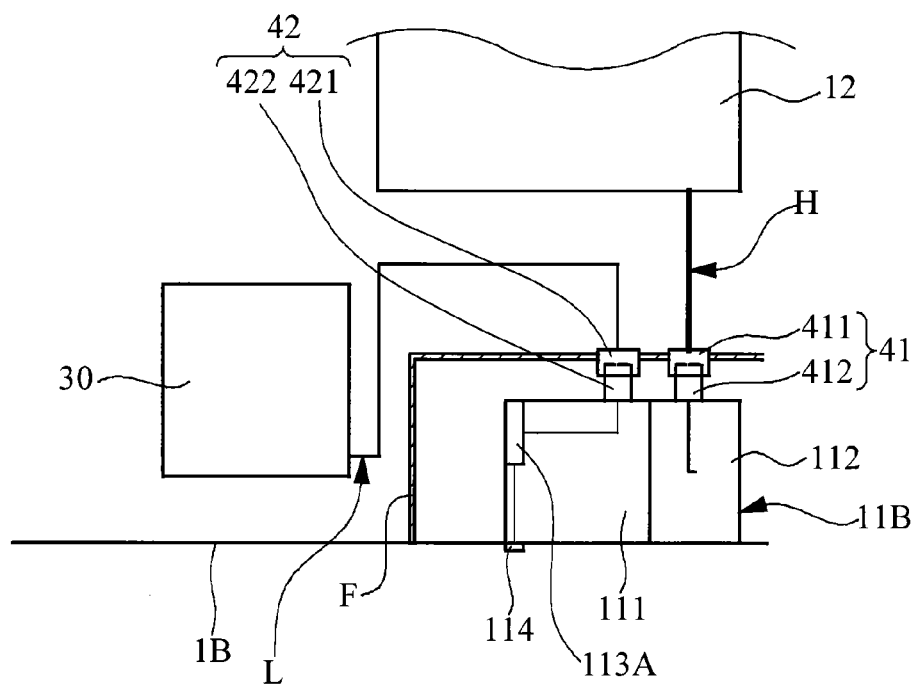
FIG. 4 is a diagram schematically illustrating a main part of the electrically driven vehicle 1B.

As illustrated in FIG. 4, an electrically driven vehicle 1B of the present embodiment is substantially the same as the electrically driven vehicle 1A except that a second connection part 42 is provided instead of the wire-added connection part 50 and a corresponding power generation unit 11B is substituted for the power generation unit 11A.

In the electrically driven vehicle 1B, a second connection part 42 is provided in the low-voltage system L. The second connection part 42 includes a connector 421 on the vehicle side, which is a second terminal part on the vehicle side, and a connector 422 on the power generation unit side, which is a second terminal part on the power generation unit side. The connector 421 is fixed to the vehicle main frame (specifically frame F), and the connector 422 is fixed to the power generation unit 11B. The connector 421 and the connector 422 are disposed to be connected together when the power generation unit 11B is mounted in the mounting position.

The power generation unit 11B is substantially the same as the power generation unit 11A except that the connector 422 is substituted for the connector 502.

A description is now given of functions and effects of the electrically driven vehicle 1B. In the aforementioned electrically driven vehicle 1A, the wire-added connection part 50 is applied to the low-voltage system L, and a damage of the coating of the wires may take place even in the low-voltage system L. In this case, there may be a possibility that an electric shock accident may happen although it does not fall into a serious situation and that a short circuit may affect the control of the ECU 30 on the vehicle side and the ECU 113A on the power generation unit side.

A short circuit may occur in a case where a damaged portion of the coatings of the wires or a terminal of the connector 501 or 502 of the low-voltage system L connects to a terminal of the connector 411 or 412 of the high-voltage system H directly or indirectly, or in a case where a wire of the low-voltage system L may be jammed between the connectors 411 and 412 at the time of installing the power generation unit 11A.

In contrast, the electrically driven vehicle 1B does not have any wires between the power generation unit 11B and the vehicle body in the low-voltage system L as well as the high-voltage system H. It is thus possible to further secure the electrically driven vehicle 1B.

Embodiment 3

Figure 5:
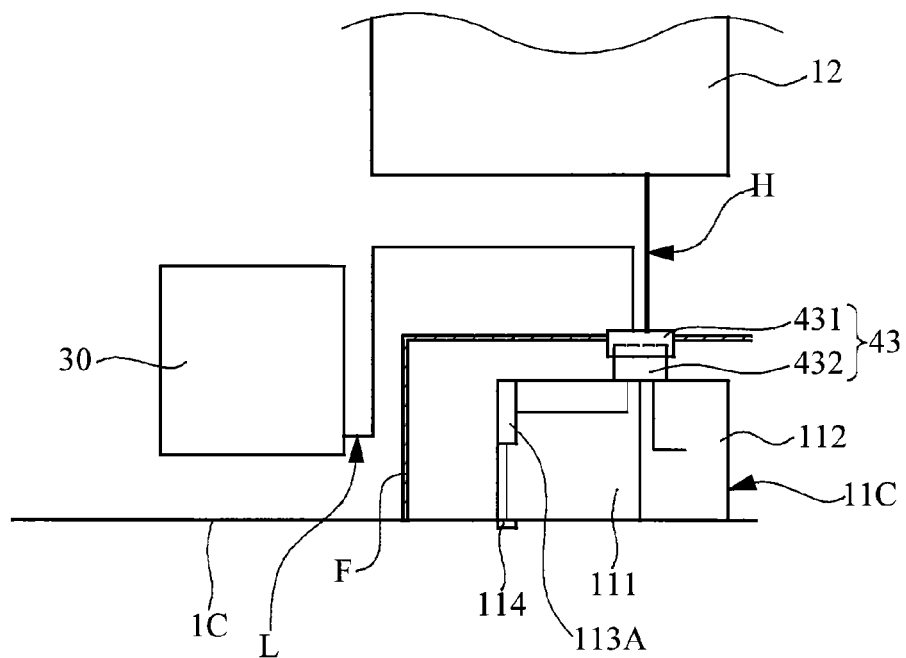
FIG. 5 is a diagram schematically illustrating a main part of the electrically driven vehicle 1C.

As illustrated in FIG. 5, an electrically driven vehicle 1C of the present embodiment is substantially the same as the electrically driven vehicle 1B except that a third connection part 43 is used instead of the first and second connection parts 41 and 42, and a corresponding power generation unit 11C is substituted for the power generation unit 11B.

In the electrically driven vehicle 1C, the third connection part 43 is provided in common to the high-voltage system H and the low-voltage system L. The third connection part 43 is a single hybrid connection part common to the high-voltage system H and the low-voltage system L. The third connection part 43 is equipped with a connector 431 on the vehicle side, which is a third terminal part on the vehicle side, and a connector 432 on the power generation unit side, which is a third terminal part on the power generation unit side. The connector 431 is fixed to the vehicle body (specifically, frame F), and the connector 432 is fixed to the power generation unit 11C. The connector 431 and the connector 432 are arranged so as to be connected together in a state in which the power generation unit 11C is mounted in the mounting position.

The power generation unit 11C is substantially the same as the power generation unit 11B except that the connector 432 is provided instead of the connectors 412 and 422.

Next, a description is given of functions and effects of the electrically driven vehicle 1C. In the aforementioned electrically driven vehicle 1B, connections at two places of the first and second connection parts 41 and 42 should be simultaneously made when the power generation unit 11B is installed. Therefore, the connection making work is not always easy in terms of positioning in the electrically driven vehicle 1B.

In contrast, in the electrically driven vehicle 1C, the connection is made at only one place of the third connection part 43. Therefore, the electrically driven vehicle 1C is capable of easily performing the connection making work on the installation of the power generation unit 11C.

Further, the electrically driven vehicle 1C equipped with the third connection part 43 has an advantageous structure in light of the cost, as compared with the structure with the low-voltage system L and the high-voltage system H.

Furthermore, the electrically driven vehicle 1C equipped with the third connection part 43 is capable of definitely preventing a mistaken connection between the high-voltage system H and the low-voltage system L and the occurrence of a short circuit.

Embodiment 4

Figure 6:
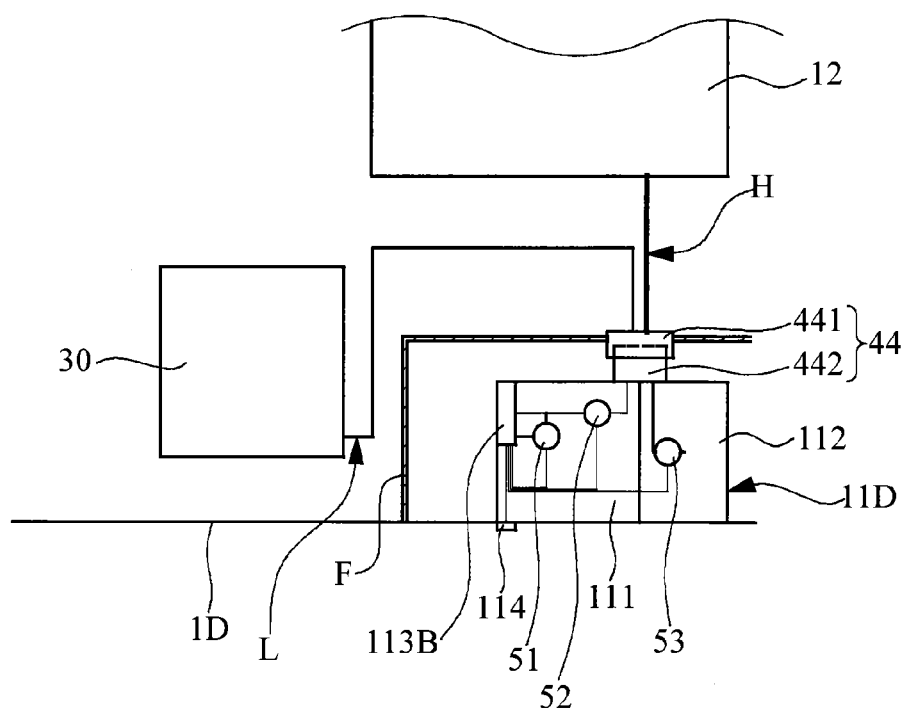
FIG. 6 is a diagram schematically illustrating a main part of the electrically driven vehicle 1D.

As illustrated in FIG. 6, an electrically driven vehicle 1D of the present embodiment is substantially the same as the electrically driven vehicle 1C except that a fourth connection part 44 is provided instead of the third connection part 43 and a corresponding power generation unit 11D is substituted for the power generation unit 11C. The fourth connection part 44 is equipped with a connector 441 on the vehicle side, which is a fourth terminal part on the vehicle side, and a connector 442 on the power generation unit side, which is a fourth terminal part on the power unit generation side. The connector 441 is fixed to the vehicle body (specifically, the frame F), and the connector 442 is fixed to the power generation unit 11D. The connector 441 and the connector 442 are arranged so as to be connected together in a state in which the power generation unit 11D is mounted in the mounting position.

Figure 7A:
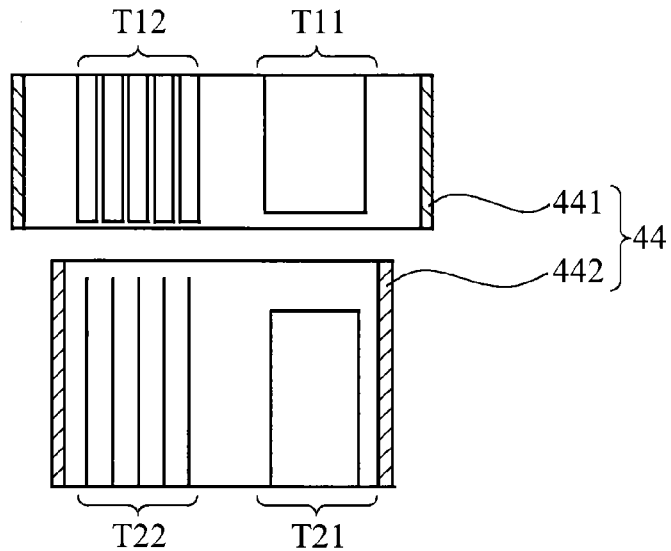
Figure 7B:
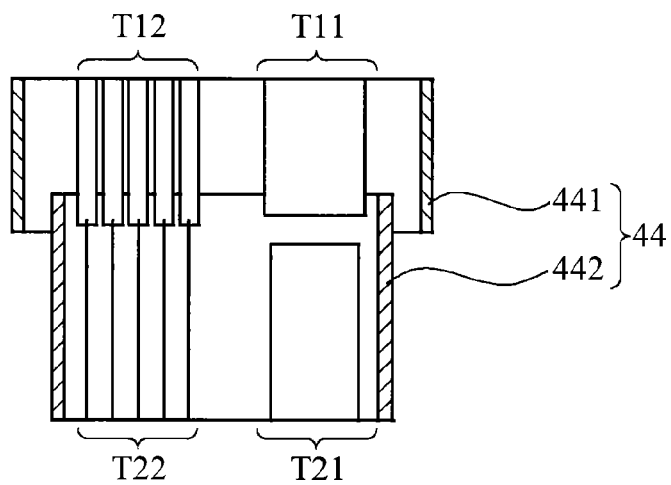
Figure 7C:
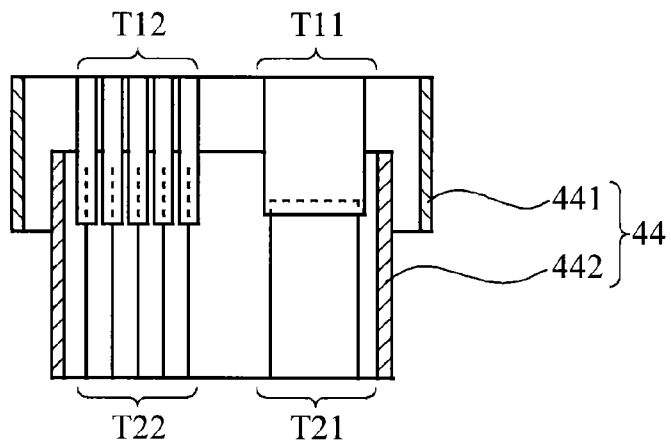

As illustrated in FIG. 7(a) through FIG. 7(c), the connector 441 has a terminal T11 of the high-voltage system H, and terminals T12 of the low-voltage system L. The connector 442 has a terminal T21 of the high-voltage system H and terminals T22 of the low-voltage system L. Further, the fourth connection part 44 is configured to make a connection between the terminals T12 and T22 of the low-voltage system L prior to making a connection between the terminals T11 and T21 of the high-voltage system. The fourth connection part 44 thus configured is a hybrid connection part and a connection sequence defining means for establishing a connection in the second electric system prior to the first electric system when connections are respectively made in the first and second electric systems.

Turning back to FIG. 6, the power generation unit 11D is substantially the same as the power generation unit 11C except that a connector 442 is provided instead of the connector 432, and there are further provided an ammeter 51 that is connection detecting means, and first and second short-circuit detectors 52 and 53, which are respectively first and second short-circuit detecting means, and that an ECU 113B on the power generation unit side is substituted for the ECU 113A on the power generation unit side. The ammeter 51 detects the connection in the low-voltage system L. The first short-circuit detector 52 detects a short circuit in the low-voltage system L, and the second short-circuit detector 53 detects a short circuit in the high-voltage system H.

The ECU 113B on the power generation side is substantially the same as the ECU 113A on the power generation unit side 113A except that connection determination means, diagnosing means, operation stop means and operation permission means are functionally realized as described later and that the ammeter 51 an the first and second short-circuit detectors 52 and 53 are electrically connected as those of the sensor/switch group.

The connection determination means is realized so as to determine whether the terminals T12 and T22 of the low-voltage system L have been connected together (whether the connection of the low-voltage system L between the vehicle body and the power generation unit 11D has been made).

The diagnosing means is realized so as to determine whether there is an abnormality when the connection of the fourth connection part 44 is made.

Specifically, the diagnosing means determines whether there is a short circuit in the low-voltage system L when the terminals T12 and T22 of the low-voltage system L are connected together (when the connection between the vehicle body and the power generation unit 11D in the low-voltage system L is made).

Further, the diagnosing means determines whether there is a short circuit in the high-voltage system H when the key switch 21 is turned ON (when an operation request is issued).

In this regard, specifically, the operation request signal is issued to the ECU 113B on the power generation unit side from the ECU 30 on the vehicle side when the key switch 21 is turned ON, and the outputting of the operation request signal is stopped when the key switch 21 is turned OFF.

The operation stop means is realized to stop the operation of the power generation unit 11D when the key switch is OFF (when there is no operation request).

In contrast, the operation stop means is realized so as to stop the operation of the power generation unit 11D when the power generation unit 11D is operating independently even in a case where the terminals T12 and T22 of the low-voltage system L are connected together.

Further, the operation stop means is realized so as to stop the operation of the power generation unit 11D when the power generation unit 11D is operating independently in another case where the diagnostics result of the diagnosing means shows that there is an abnormality.

In these two cases, specifically, the operation stop means is realized so as to stop the operation of the power generation unit 11D irrespective of whether the operation request is issued or not.

The operation means is realized so as to operate the power generation unit 11D when the key switch 21 is ON (when the operation request has been issued).

In contrast, the operation means is realized so as to operate the power generation unit 11D to output low power when the key switch 21 is turned ON (when the operation request is turned ON).

Further, the operation means is realized so as to drive the power generation unit 11D in the normal operation when the diagnostic result of the diagnosing means shows no abnormality (specifically, when no short circuit takes place in the high-voltage system H) under the condition that the operation request has been issued and the power generation unit 11D is operating to output low power.

Figure 8:
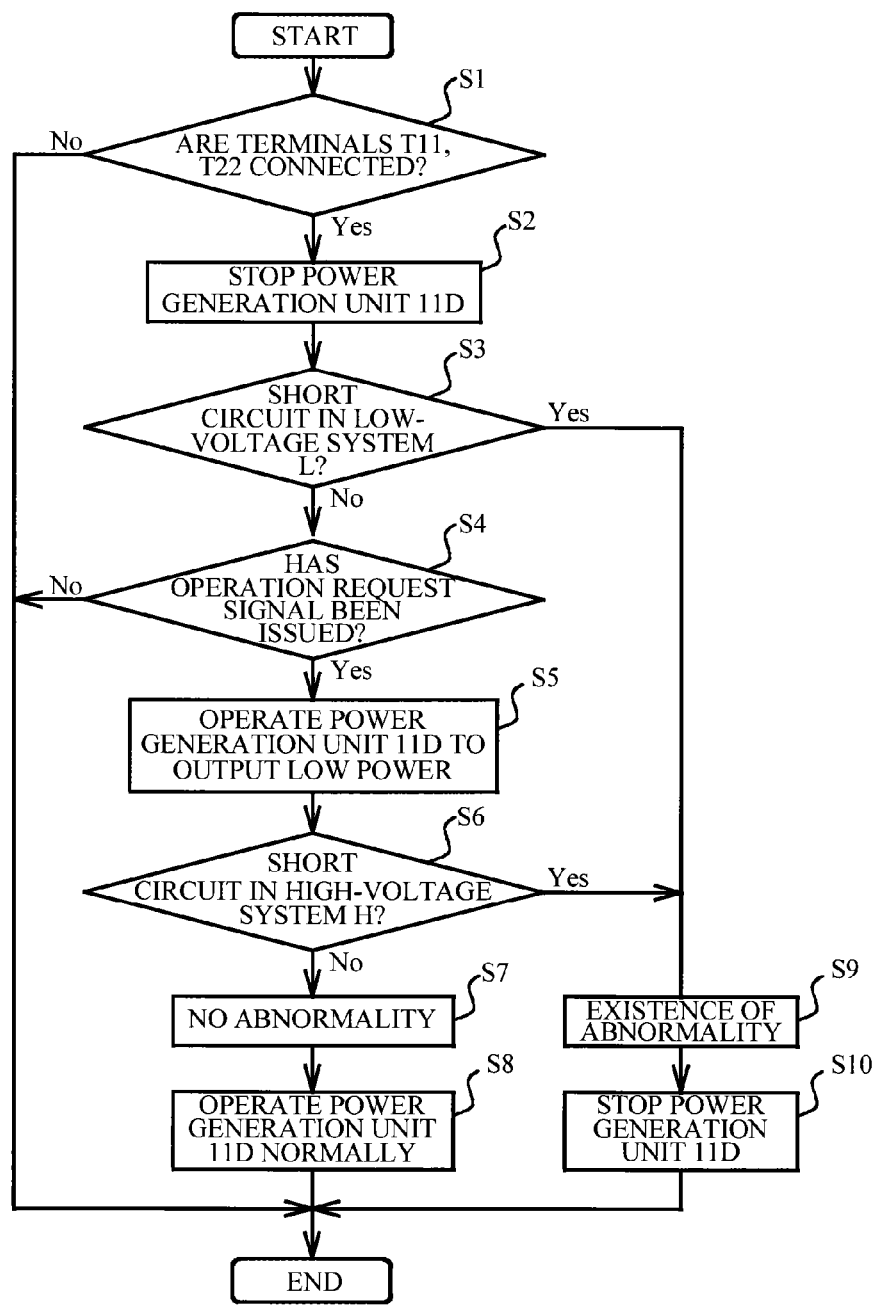
FIG. 8 is a flowchart of an operation of an ECU 113B on the power generation unit side.

Next, a description is given of an operation of the ECU 113B on the power generation unit side with reference to a flowchart of FIG. 8. The ECU 113B on the power generation unit side determines whether the terminals T12 and T22 of the low-voltage system L are connected together (step S1). When a negative determination is made, no specific process is needed and the present flowchart ends. In contrast, when a positive determination is made in step S1, the ECU 113B on the power generation unit side stops the power generation unit 11D (step S2). Subsequently, the power generation unit 11D determines whether a short circuit takes place in the low-voltage system L (step S3). When a positive determination is made, the ECU 113B on the power generation unit side determines that there is an abnormality (step S9), and the stops the power generation unit 11D (step S10). In this case, additionally, an alarm lamp may be turned ON or a buzzer may be activated.

In contrast, when a negative determination is made in step S3, the ECU 113B on the power generation unit side determines whether the operation request signal has been issued (step S4). When a negative determination is made, the present flowchart ends. In contrast, when a positive determination is made in step S4, the ECU 113B on the power generation unit side operates the power generation unit 11D to output low power (step S5). Subsequently, the ECU 113B on the power generation unit side determines whether there is a short circuit in the high-voltage system H (step S6). When a positive determination is made, the process proceeds to step S9. In contrast, when a negative determination is made in step S5, the ECU 113B on the power generation unit side determines that there is no abnormality (step S7), and operates the power generation unit 11D normally (step S8).

Here, there is a possibility that an internal short circuit may take place in a portion other than the connections between the power generation unit 11D and the vehicle body in the low-voltage system L and the high-voltage system H.

In contrast, since the electrically driven vehicle 1D defines the connection sequence of the low-voltage system L and the high-voltage system H, it is possible to surely stop the power generation unit 11D before the connection in the high-voltage system H is made even when the power generation unit 11D is operating solely. Thus, the electrically driven vehicle 1D is capable of operating to output low power prior to the normal operation when the operation request is issued. Thus, it is possible to more safely confirm the presence or absence of an internal short circuit particularly in the high-voltage system H. If an internal short circuit exists in the low-voltage system L or the high-voltage system H, the power generation unit 11D is stopped, so that the safety can further be improved.

Embodiment 5

Figure 9:
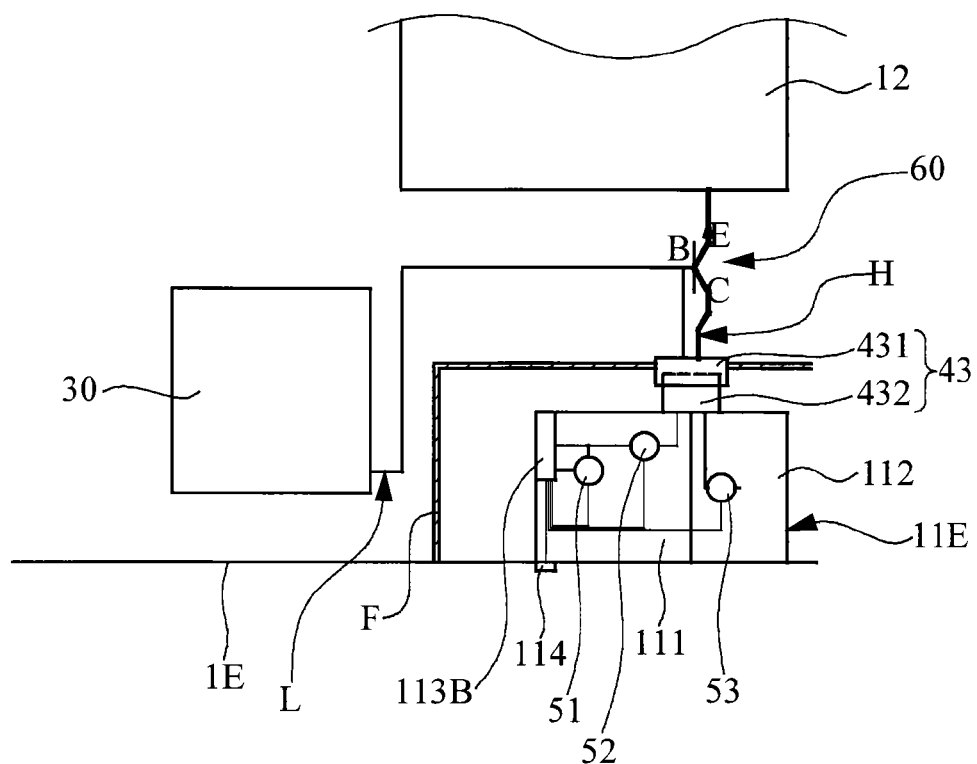
FIG. 9 is a diagram schematically illustrating a main part of an electrically driven vehicle 1E.

As illustrated in FIG. 9, an electrically driven vehicle 1E of the present embodiment is substantially the same as the electrically driven vehicle 1D except that the third connection part 43 is provided instead of the fourth connection part 44 and the corresponding power generation unit 11E is substituted for the power generation unit 11D and that a transistor switch 60 is further provided.

The transistor switch 60 is provided in a portion of the vehicle body in the high-voltage system H. Specifically, a collector C of the transistor switch 60 is connected to the connector 431, and an emitter E thereof is connected to the battery 12. A base B is connected to the low-voltage system L. The transistor switch 60 is connection sequence defining means for defining the connection sequence in which the connection of the second electric system is made before the connection of the first electric system is made when these connections are made.

The power generation unit 11E is substantially the same as the power generation unit 11D except that the connector 432 is substituted for the connector 422.

Since the electrically driven vehicle 1E is equipped with the third connection part 43, the connection in the high-voltage system H and that in the low-voltage system L are simultaneously made, when these connections are made. However, the electrically driven vehicle 1E is capable of defining the connection sequence in such a way as to make the connection in the low-voltage system L prior to the connection in the high-voltage system H by the transistor switch 60.

Thus, in the electrically driven vehicle 1E, the ECU 113B on the power generation unit side performs an operation similar to the aforementioned operation of Embodiment 4, and obtain effects similar to those of the electrically driven vehicle 1D.

The above-described embodiments are exemplary preferred embodiments of the present invention. However, the present invention is limited to those, but may include various embodiments and variations without departing from the scope of the present invention.

For example, the above-described embodiments have explained a case where the power generation units 11 are an engine driven type of power generation units. However, the present invention is not limited to this, but a fuel cell type of power generation unit that generates power by a fuel cell may be applied. In this regard, the electrically driven vehicle of the present invention may be an electrically driven vehicle equipped with a power generation unit of any power generation type, such as an electrically driven vehicle with a fuel cell type of power generation unit.

Embodiment 4 described above is configured to realize the various means by the ECU 113B on the power generation unit side because this implementation is considered as being structurally rationale.

However, the present invention is not limited to this, but may be realized to implement means for realizing functions similar to those realized by the above-described various means by, for example, the first control unit or the first and second control units. That is, the control unit that is the subject of making conditional determinations may be the first control unit or the first and second control units to make connection determinations and perform diagnosis and to start and stop of the power generation unit similarly.

Also, Embodiment 5 described above has explained a case where the transistor switch 60 that is the connection sequence defining means is used along with the third connection part. However, the present invention is not limited to this, but the connection sequence defining means may be used with the first or second connection part. Also, in this case, the second control unit may be configured like the ECU 113B on the power generation unit side previously described in Embodiment 4.

The various means functionally realized by the ECU 113B on the power generation unit side in Embodiment 4 may be realized by, for example, hardware such as an electronic control unit or a dedicated electronic circuit or its combination.

DESCRIPTION OF REFERENCE NUMERALS

| | |
|---|---|
| 1 | electrically driven vehicle |
| 11 | power generation unit |
| 113 | power generation unit side ECU |
| 12 | battery |
| 30 | ECU on vehicle side |
| 41 | first connection part |
| 42 | second connection part |
| 43 | third connection part |
| 44 | fourth connection part |
| 60 | transistor switch |

The invention claimed is:

1. An electrically driven vehicle equipped with a battery usable for running, the electrically driven vehicle comprising:
a power generation unit including an engine and a generator driven by the engine that charges the battery, the power generation unit being detachably mounted on a vehicle body, and a connection part that brings a first electric system in which the battery and the power generation unit are electrically connected together into a connected state in a state in which the power generation unit is mounted in a mounting position and brings the first electric system into a disconnected state in a state in which the power generation unit is dismounted from the mounting position, the connection part switches a connection state of the first electric system in accordance with mounting or dismounting of the power generation unit, wherein the connection part electrically connects the vehicle body and the power generation unit together in the state in which the power generation unit is mounted in the mounting position and brings a second electric system having a system voltage lower than that of the first electric system into a connected state and brings the second electric system into a disconnected state, the connection part switches a connection state of the second electric system in accordance with mounting or dismounting of the power generation unit, the connection part includes a hybrid connection part common to the first and second electric systems, the connection part is configured to bring the second electric system into the connected state prior to the first electric system when the power generation unit is mounted in the mounting position, and the electrically driven vehicle further comprises control circuitry that stops an operation of the power generation unit when the second electric system is brought into the connected state prior to the first electric system in a state in which the power generation unit is operating.

\* \* \* \* \*